April 2, 1946.    F. L. MICHAELS    2,397,878
PARKING METER MECHANISM
Filed Oct. 30, 1941    4 Sheets-Sheet 1

INVENTOR.
Frank L. Michaels.
BY Murray Sackh H Paddack
ATT'YS.

April 2, 1946. F. L. MICHAELS 2,397,878
PARKING METER MECHANISM
Filed Oct. 30, 1941  4 Sheets-Sheet 2

INVENTOR.
Frank L. Michaels.
BY Murray, Sackhoff & Paddack
ATT'YS.

April 2, 1946.   F. L. MICHAELS   2,397,878
PARKING METER MECHANISM
Filed Oct. 30, 1941    4 Sheets-Sheet 3

INVENTOR.
Frank L. Michaels.
BY Murray, Sachhoff & Paddock
ATT'YS.

April 2, 1946.   F. L. MICHAELS   2,397,878
PARKING METER MECHANISM
Filed Oct. 30, 1941   4 Sheets-Sheet 4

INVENTOR.
Frank L. Michaels.
BY Murray, Sachhoff & Paddack.
ATT'ys.

Patented Apr. 2, 1946

2,397,878

UNITED STATES PATENT OFFICE 2,397,878

PARKING METER MECHANISM

Frank L. Michaels, Fort Thomas, Ky., assignor to The Michaels Art Bronze Company, Covington, Ky., a corporation of Kentucky Application October 30, 1941, Serial No. 417,177

5 Claims. (Cl. 194—92)

The present invention relates to parking meters and has for an object the provision of a meter that is adapted for manual setting by the motorist, after deposit of one or more selected coins, in order to prepay different parking periods within the maximum time for which the meter is arranged to operate.

A further object of the invention is to provide a manually set parking meter having a single, coinway for the reception of deposited coins of more than one predetermined size and denomination so that a motorist may utilize, for example, either pennies or nickels to prepay a permitted parking period and receive proportionate values in prepaid parking time.

A still further object of the invention is to provide a meter mechanism of the manually set coin controlled type to receive coins of more than one size with different money values and to register the total money value of all deposited coins on a simple counter device.

Another object of the invention is to provide a mechanism for the foregoing purposes that is simple in construction and which embodies relatively few moving parts and at the same time is adaptable to adjustment for any of a variety of predetermined parking periods.

These and other objects are attained by the means described herein and disclosed in the accompanying drawings, in which.

Figure 2:
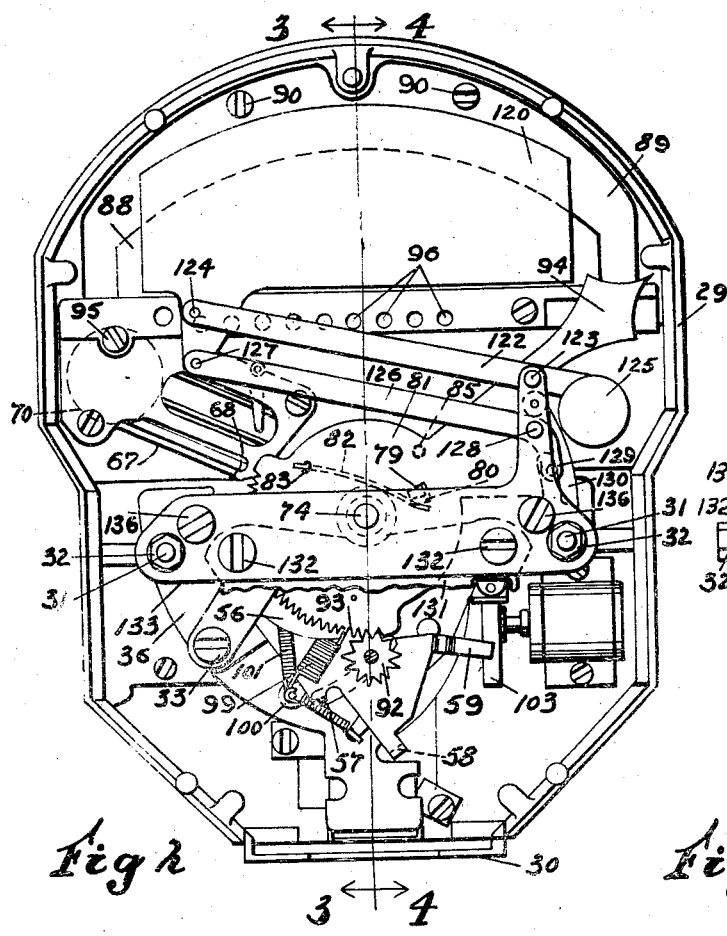
Fig. 2 is an elevational view showing a removable section of the meter casing of Fig. 1 with the mechanism of the invention attached, the clockwork mechanism being broken away.

The meter of the invention is housed in a casing 25 mounted on a tubular standard 26. The details of the casing form no specific part of the present invention but are shown as substantially similar in construction to the casing illustrated in my co-pending application for a Parking meter, Serial No. 282,645, filed July 3, 1939, now U. S. Patent No. 2,311,242 of February 16, 1943. The removable casing section 27 joins the fixed section 28 along the vertical edges 29 and horizontal bottom edge 30. The connection between the fixed and removable casing sections is by means of screws (not shown) entering hollow threaded bores 31 in stud posts 32.

The posts 32 carry male threads at the remaining ends and these, together with a screw 33, pass through the bores 34—34 and 35 of a support plate 36 and secure said plate to the tops of threaded bosses 37 and 38 on the inside face of the casing. Secured on the rear face of the plate 36 is an inclined channel shaped member 39 having flanges 40 and 41 riveted to plate 36 and having its top edge 42 flared outwardly for the reception of a coin to be passed therethrough. The bottom edge of channel 39 is cut away as at 43 to provide a coin-inspection station above a forwardly inclined coin discharge tube 44. A sight glass 45 is mounted over an aperture 46 in the wall of the casing to provide a telltale sight opening through which a coin may be inspected for the purpose of detecting offenders using slugs for the operation of the meter. The plate 36 and its attached channel shaped member 39 have registering arcuate slots 47 and 48, respectively, disposed on a radius with pivot post 49 as a center. The plate 36 also has an arcuate edge 50 disposed in a radius on the same center, this arcuate edge 50 extending partly across the top of the hollow coin discharge tube 44.

Figure 5:
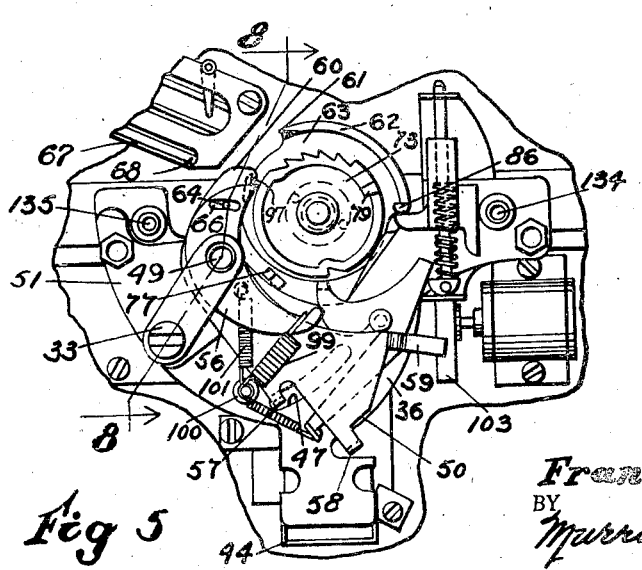
Fig. 5 is a fragmental view of the mechanism of Fig. 2 with the indicator hand and the violation signal and its support removed.
Figure 1:
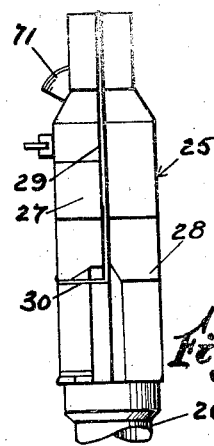
Fig. 1 is a side elevational view of a meter of the invention with the supporting standard broken away.
Figure 8:
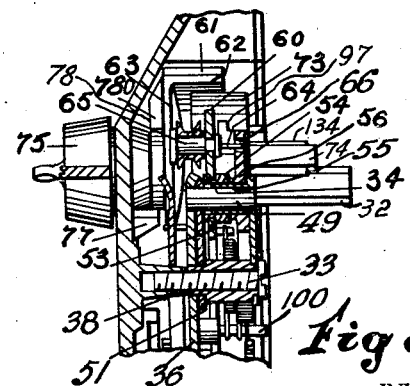
Fig. 8 is a cross-sectional view taken on line 8—8 of Fig. 5.

An odd shaped reinforcing plate 51 (see Fig. 5) is secured on the plate 36 at the upper lefthand side and on it are secured the pivot post 49 and a spacer hub 52 through which the screw 33 passes. An odd shaped main lever 53 has a hub 54 secured thereto, which hub is journalled on a thimble 55 of a pawl 56 which has its bearing directly on the pivot post 49. Lever 53 thus swings about post 49 as its pivotal center and it is provided on its outer edges with rearwardly turned lugs 57 and 58, the first mentioned lug 57 extending through the registering slots 47 and 48, while the last mentioned lug 58 may swing in parallelism with the arcuate edge 50 of plate 36 to and from a position blocking the top of coin discharge tube 44. In relatively opposed relation to the coin control lugs 57 and 58, the lever 53 has a parallel offset finger 59 which is disposed in a relatively forwardly relation to the body of the lever. The uppermost end 60 of main lever 53 is normally disposed as a coin released latch, directly in the path of the end 61 of a flange 62 on a coin pusher segment 63. Intermediate the center of pivot post 49 and the end 60 of lever 53 a pin 64 projects through said lever. When the main lever 53 is in the position, for example, as shown in Fig. 5, the pin 64 is in a dead center position on the radius of flange 62 so that the end 60 of the lever positively precludes any appreciable rotation of pusher segment 63 about its axis. On the rear face of lever 53 a grooved roller 65 is suitably journalled on the pin 64. The opposite end of pin 64 projects forwardly through an arcuate slot 66 in the upper portion of pawl 56, said slot also having pivot post 49 as its radial center. A coin guide rib 67 formed integrally with the casing section 27 terminates at 68 just above the grooved roller 65 so that a coin 69 entered through opening 70 (see Fig. 2) in the outside of the casing beneath hood 71 may roll down the guide rib 67 and come to rest on the grooved roller 65 where it will also rest against hub 72 of coin pusher segment 63 and in position to be engaged by the end 61 of flange 62. The coin at this time is disposed between the face of pusher segment 63 and the back of toothed hub 73. A center shaft 74 has the coin pusher segment 63 fixedly mounted thereon by the threaded engagement of hub 72, the end of the hub 72 serving to space the toothed hub 73 for the reception of the coin as aforesaid. Exterior operating handle 75 serves to turn shaft 74 and the affixed coin pusher segment 63 and an encircling, concealed coil spring 76 anchored at one end within the handle 75 and at the other end in member 63, urges handle 75 and associated parts in a counterclockwise direction. Integral stop lugs 77 on the casing (see Figs. 5, 8 and 9) cooperate with opposite faces 780 of segmentally shaped extension 78 on the rear of member 63. Toothed hub 73 has a laterally projecting lug 79 which fits loosely into an aperture 80 in an indicator member 81 when the latter is journalled on the shaft 74. A spring wire 82 has an end 83 extending through the indicator member 81 and has the opposite end flexed and inserted alongside lug 79 whereby a limited amount of lost motion exists between toothed hub 73 and the indicator member 81. As can be best seen in Fig. 14, the indicator member 81 has a second aperture 84 diametrically opposite the aperture 80 so that toothed hub 73 may be alternatively connected to the indicator member 81 after turning the same through 180° from the position shown, for example, in Fig. 2. The spring member 82 is changed to a relatively opposite position when such adjustment is made. Projecting from the back of indicator member 81 is a pin 85 which is engageable by a forwardly projecting finger 86 on the flange 62 of the coin pusher segment.

Figure 6:
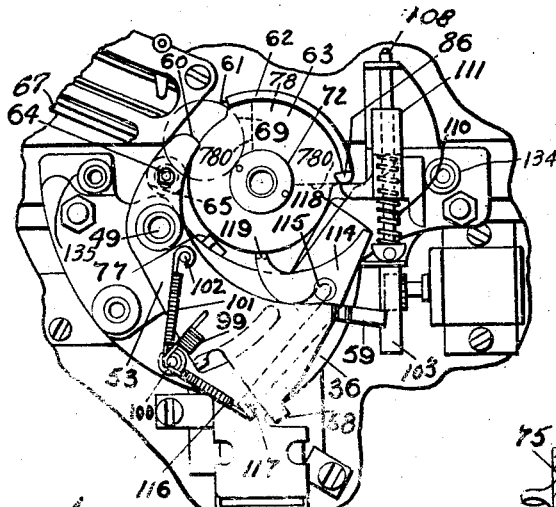
Fig. 6 is a fragmental view showing the mechanism of Fig. 5 with the adjustable ratchet hub and the penny control pawl removed, and showing in dotted lines the position of a deposited coin before manual operation of the handle.

From the foregoing it will be noted that in the absence of a coin such as 69 (see Fig. 6) a handle 75 may be rotated in a clockwise (counterclockwise in Fig. 6) direction to move the end 61 of flange 62 on the coin pusher segment into abutment with the end 60 of main lever 53 before the finger 86 can contact pin 85 on the indicator member 81. The meter is thus locked against any substantial movement of the handle 75 so that the meter cannot be possibly set without prior deposit of a coin. When a coin such as 69 is positioned and the handle 75 is turned clockwise by the operator (counterclockwise as viewed in Fig. 6), the segment 63 is turned in a like direction. This causes the coin to push against roller 65 and causes the main lever 53 to pivot about its mounting 49 and thus remove the end 60 from the path of the coin pusher segment. The coin then drops and is arrested by lug 57, while lug 58 releases a previously deposited coin which it had supported at the inspection station 43. When lever 53 returns, the coin 69 drops from lug 57 and is supported by the lug 58.

Figure 9:
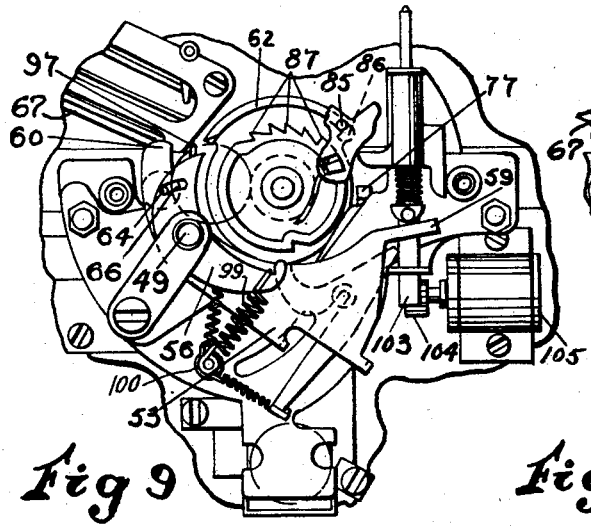
Fig. 9 is a view similar to Fig. 6 showing the position of the parts when initially released by engagement of the coin pusher upon a deposited nickel with the rack in position for actuating the counter to register five units and with a previously deposited coin just released and passing out of the end of the coin guide.
Figure 10:
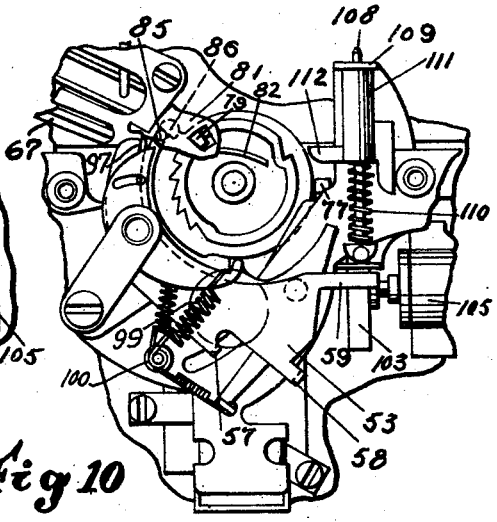
Fig. 10 is a view similar to Fig. 9 but showing the nickel moved to its limit by the coin pusher, a ratchet hub turned to its limit wherein the indicator is set for a one hour period of operation, and the ratchet returned to normal position after having actuated the counter to register five units.

The degree of rocking movement of main lever 53 is determined by the diameter of the coin so that if a nickel or five cent coin is deposited, the parts initially assume the position as shown in Fig. 9 where finger 86 is ready to pick up pin 85 for turning the indicator member. The degree of rocking movement imparted to main lever 53 is sufficient for the pin 64 to reach the end of slot 66 in pawl 56 and rock said pawl entirely clear of the path of the teeth 87 of toothed hub 73, so that when the handle is manually moved to its limit, the indicator member 81 is moved to the full limit or entirely across to the side 88 of the window opening in the casing. 89 represents an interchangeable dial member which, in the embodiment shown in Figs. 1–12, inclusive, is divided into sixty minutes which constitutes the maximum possible setting of the indicator member 81. Member 89 is mounted in position to be visible below the top of the window by means of screws 90. A time mechanism indicated in dotted lines at 91 has a gear 92 meshing with the tooth gear portion 93 of indicator member 81 so that during the setting operation, while the indicator hand 94 is being moved to a setting position by manual operation of the handle 75, the pinion 92 is winding the time mechanism 91. The hand 94 abuts a screw 95 which is positioned as shown in Fig. 2 whenever the hand is set to the maximum permitted setting. Said screw 95, however, may be adjusted to any of the threaded perforations 96 in order to reduce the maximum permitted setting of the indicator hand, regardless of the size or number of coins used. Such an adjustment would be resorted to in order to accommodate the maximum permitted parking period to the normal degree of congestion in a particular area in which the meters are installed. In any event, whenever a nickel is pushed through the meter by the end 61 of the coin pusher segment, the pawl 56 is also retracted far enough to move a projecting fin 97 on member 56 sufficiently so that the flange 62 passes below it and, when the coin drops, the fin 97 will ride on the outside of flange 62 and permit continued manual turning of the segment 63.

Figure 11:
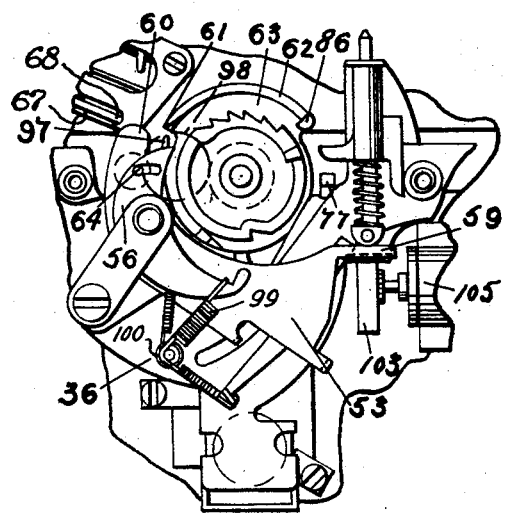
Fig. 11 shows the position of parts when initially engaged upon a deposited penny, showing the ratchet positioned to actuate the counter to register one unit.
Figure 12:
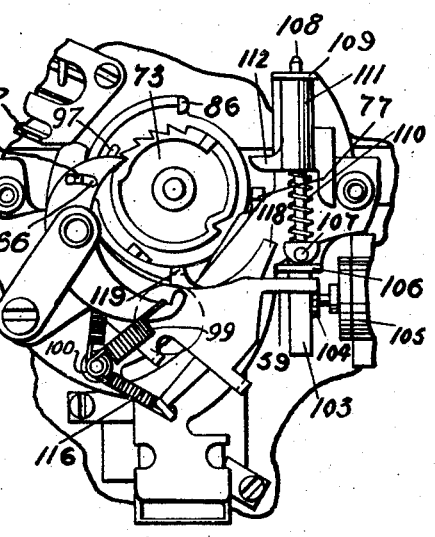
Fig. 12 is a view similar to Fig. 11, but showing the penny moved to its limit by the coin pusher, the penny control pawl precluding movement of the ratchet hub beyond one-fifth of a complete cycle.
Figure 13:
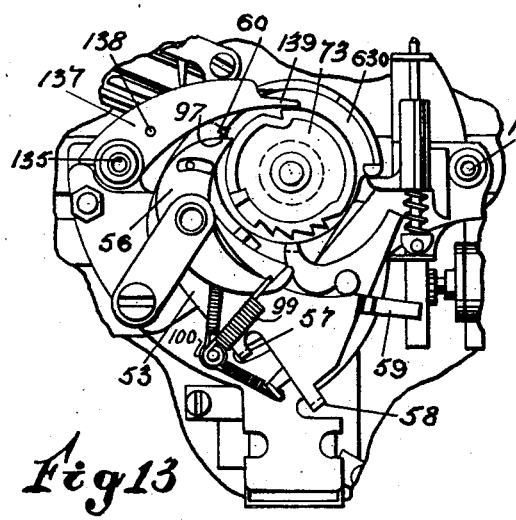
Fig. 13 is a view with the mechanism of Fig. 9 modified for use as a two-hour parking meter.

Referring now to Figs. 11 and 12, it will be noted that when a penny which is of lesser diameter than the five cent coin is inserted in the meter, the end 61 on segment 63 will engage the penny 98 and in pushing thereon will retire the end 60 of main lever 53 from blocking position but will not move fin 97 on pawl 56 far enough to clear flange 62; hence the passage of the penny beyond the support roller 65 will allow the pawl to forthwith drop back against the toothed hub after passing but one of the teeth 87. The toothed wheel returns very slowly in the opposite direction after the handle is released, i. e., at the rate of one tooth each twelve minutes as it is driven by the clockwork. Hence if a second penny is inserted forthwith, and the handle is again actuated, the force necessary to operate the mechanism will repeat the lifting of the pawl as said second penny is pushed through and the toothed hub will be advanced another tooth in that interval. It is physically impossible to arrest the manual effort so suddenly as to push the penny beyond control and retard the toothed wheel without advancing one tooth. The progressive setting by the use of additional pennies may be repeated if desired to attain a maximum indicator setting. As can be readily seen in Figs. 5, 6 and 9, a spring 99 has one end hooked on a stud 100 and the other end hooked over the adjacent end of pawl 56. A spring 101 has one end hooked over the stud 100 and the opposite end secured to a pin 102 on main lever 53, thus assuring spring action return of the parts.

From a comparison of Figs. 9 and 11, it will be readily apparent that when main lever 53 is rocked by passage of a five cent coin, the finger 59 thereof will pass through an appreciably greater arc than in the case of the same finger during the passage of a penny. While the actual difference in the diameters of the two coins is very slight, i. e., of the order of three thirty-seconds of an inch, the location of the pivot of the lever on the stud 49 is such as to so multiply the amount of movement of finger 59 as compared to the opposite end 60 of the lever as to utilize the same for adjusting a spring pressed rack 103 relative distances so that it may operate on the pinion 104 of an irreversible counter 105 and cause said counter to register one unit each time the lever is moved by the passage of a penny and to register five units each time the lever is caused to move by the passage of a five cent coin. The counter 105, which is of any suitable or known construction, will therefore always register the total value of coins expressed in cents which have passed through the meter regardless of whether such coins have been pennies only, nickels only, or both nickels and pennies. This greatly facilitates the keeping of records and the checking of receipts from the parking meters since the money value of deposited coins removed at any collection need merely check with the difference between the current reading of the counter and a previous reading of the counter.

Reference is now made to the rack and counter structure shown, for example, in Fig. 12 where it will be noted that a horizontal yoke 106 supported on plate 36 has the toothed rack 103 vertically movable therethrough. A lug 107 above the toothed section of the rack is adapted for engagement by the finger 59 for raising the rack in accordance with the degree of lifting movement of the finger 59. A guide rod 108 passes through a perforate guide ear 109 and is surrounded by a coil spring 110 which abuts the lug 107 on the top. A tubular member 111 is capable of independent reciprocation on rod 108 and is of such inside diameter that an appreciable portion of coil spring 110 extends into it. An ear 112 is provided on the side of member 111 and is normally engaged by the finger 86 when coin pusher segment 63 is released. However, as soon as the coin pusher segment is manually moved, the member 111 may slide upwardly under the influence of the spring 110 until member 111 abuts 109. The spring 110 at this time is fully extended and it requires very little force for finger 59 to raise lug 107. The spring 110 thus serves as a light snubber when member 111 is elevated during removal of finger 86 from the ear 112 so that the slight degree of movement of rack 103 due to the engagement of finger 59 on the lug 107, preparatory to conditioning the rack for registering one penny, may be accurate and uniform regardless of whether the operator of the meter has turned the handle 75 slowly and gently or violently. The movement of the rack under operation by use of a penny shifts the rack 103 upwardly for the distance of one tooth 113 only and the pinion 104 of counter 105 remains in mesh therewith during this movement. The counter, being of the irreversible type, the pinion 104 thereof is ratcheted in the customary manner and does not turn the counter on the upstroke of the rack 103. The relatively mild compression of spring 110 at this point may at times prove insufficient to drive the rack downwardly in order to turn pinion 104 for a distance of one tooth in order to cause the counter to register one unit. This eventuality is guarded against by reason of the fact that when the finger 86 of coin pusher 63 returns under the influence of the handle spring, the ear 112 is engaged and member 111 is pushed downwardly to the position shown in Fig. 6 so that considerably additional compression is imparted to spring 110 to furnish the necessary power for operating the counter. As can be best seen in Figs. 6 and 9, a rack control member 114 may be provided on a pivot 115 and is under the influence of a coil spring 116 which is looped over the pin 100 at one end and around the end of leg 117 at the other. The spring constrains a squared nose portion 118 to engagement with the side of the teeth 113 of rack 103 to permit raising of the rack and preclude accidental lowering of the rack. Member 114 has a lug 119 (see Fig. 6) which extends under the edge of member 63. The edge of member 63 is slightly eccentric with its pivotal center so that when member 63 has been turned to the limit of movement under manual setting operation, as is clearly shown, for example, in Fig. 12, the lug 119 has been depressed against the resistance of its spring 116 and the nose 118 has been retracted from the side of the rack 103, thus positively releasing the latter to the action of spring 110. Member 114 is vital to the proper operation of the machine only in so far as it precludes a well informed person from mischievously rocking main lever 53 back and forth by skillful oscillation of the handle 75 without pushing the inserted coin completely off the roller 65. Such a skilled but mischievous operation, in the absence of the member 114, would cause an undesired false actuation of the counter. With the structure shown and the parts arranged as in Figs. 2 to 12, inclusive, the depending arcuate dial member 89 would provide for a maximum setting of sixty minutes and would be divided in a well known manner (not shown) into sixty minutes with suitable figures at intervals indicating stated fractions of an hour. When a penny is inserted and the handle 75 is turned clockwise to its permitted limit, the indicator member 81 would be turned to carry the indicator hand 94 to register twelve minutes. The clockwork or timer mechanism 91, which is always under slight spring power even when at rest, has been wound and the gear train is arranged in well known fashion so that the return to zero of the indicator hand under the power of mechanism 91 would occur in twelve minutes.

If, however, the device be conditioned with one or more additional pennies and the handle actuated to carry each penny through without allowing any appreciable lapse of time, the several hub teeth 87 would be successively advanced by the succeeding operations so that indicator hand 94 would be advanced an additional twelve minutes or one-fifth of an hour for each of the pennies. A motorist may therefore selectively set the meter by the use of pennies from one-fifth of an hour to and including one hour. This operation will be well understood in view of the explanation concurrent with the description of the structure.

The motorist may also set the meter for a one hour parking period by the deposit of a nickel. Should the meter be in operation with the hand 94 in some intermediate position, the deposit of an additional nickel will merely serve to move the hand to the one hour limit. Under a similar condition should an additional penny be deposited, it can serve only to move the hand 94 to the nearest one-fifth interval in advance. As clearly disclosed in my hereinbefore mentioned co-pending application Serial No. 282,645, now U. S. Patent No. 2,311,242 of February 16, 1943, a vertically movable violation signal 120 is arranged to rise before window 121 when the indicator hand 94 is returned to zero position under the power influence of the time mechanism 91. The operation of violation signal 120 is effected by pivoting a lever 122 on a fixed pivot 123 closely adjacent one end of the lever and pivoting the opposite end of the lever at 124 upon the bottom of the signal member 120. Counterweight 125 on lever 122 closely adjacent to pivot 123 allows the signal 120 to have but a slight overbalance of weight which will cause the signal to normally descend. A second lever 126 has its end pivoted at 127 immediately below the pivot 124 and it has a fixed pivot 128 immediately below pivot 123. A pin 129 in the free end of lever 126 is engageable by an arcuate integral finger member 130 formed on the indicator unit 81. Lever 126 holds the signal at all times in a vertical position, and the engagement of the pin by the finger 130 on the indicator member allows the clockwork mechanism driving the hand to raise the violation signal with ease at the proper time.

Figure 14:
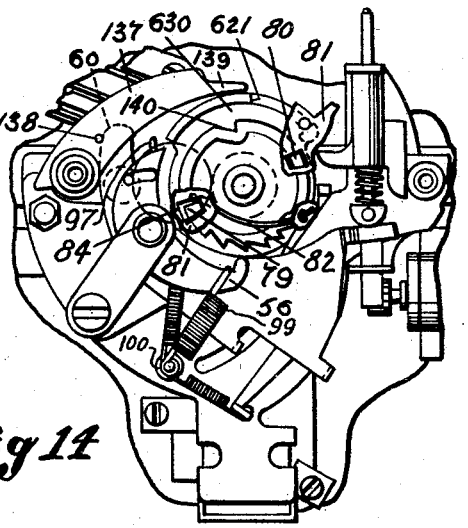
Fig. 14 is a view of the mechanism of Fig. 13 at the beginning of its setting operation on the first inserted nickel.
Figure 15:
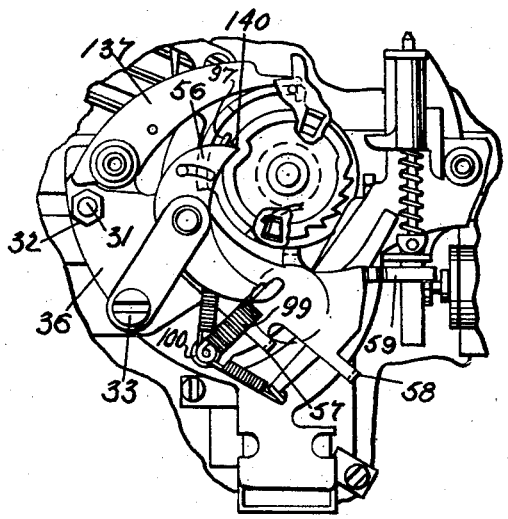
Fig. 15 is a view of the parts of Fig. 14 at the end of the setting operation on the first nickel and ready for release for operation of the meter or for the further setting operation with a second nickel.

When it is desired to adapt the mechanism just described for use as a two hour limit parking meter, dial 89, which is divided into sixty minutes, is replaced by a structurally similar dial divided into one hundred twenty minutes. The clock mechanism 91, which is a unitary structure removably mounted by its extended flange 131 and screws 132 on brace member 133, is replaced by an exteriorly identical clockwork mechanism which is powered and geared for two hour operation. The toothed hub 73 is released from the indicator member 81 and turned through 180° and then reassembled by pressing the lug 79 in the aperture 84 which is farthest from the hand 94 changing the location of the spring 82, all as shown in Fig. 14.

Figure 3:
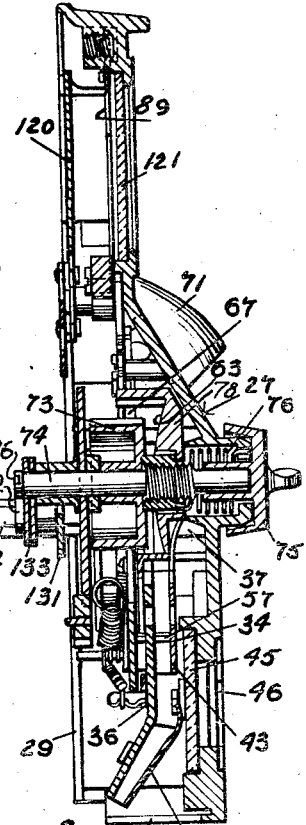
Fig. 3 is a vertical sectional view taken on line 3—3 of Fig. 2.
Figure 4:
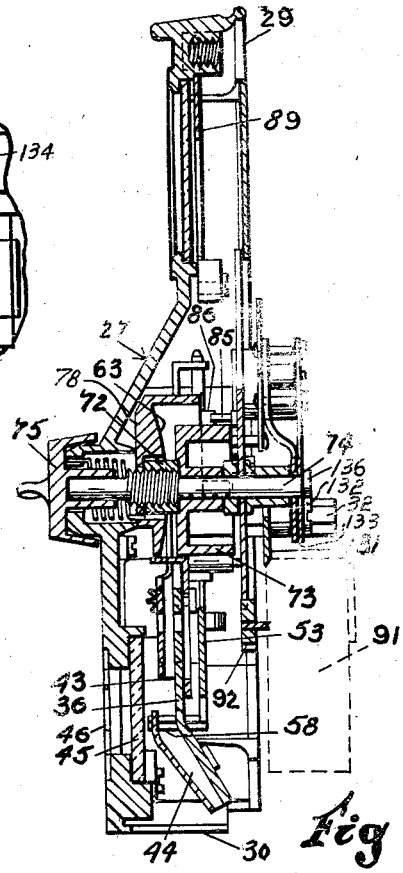
Fig. 4 is a vertical sectional view taken on line 4—4 of Fig. 2, but showing in dotted outline the clockwork housing.
Figure 7:
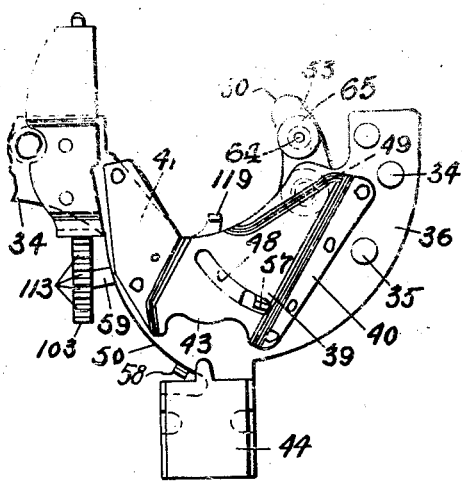
Fig. 7 is a view showing the reverse side of the meter frame plate removed from the casing.

The back plate 36 has a pair of forwardly extending spacer posts 134 and 135 riveted thereto and on the shouldered forward ends of these posts the brace member 133 is secured by means of screws 136 (see Figs. 2, 3 and also Fig. 4). In assembling the modified form of the device of Figs. 13 to 16 inclusive, a pawl 137 is mounted on post 135 prior to reassembling brace member 133. Pawl 137 has a pin 138 fixed therein and extending rearwardly in the path of the end 60 of main lever 53 so as to be engaged by said end of the main lever to raise the slender point 139 of pawl 137 high enough to clear the coin pusher 630 which corresponds to the hereinbefore described coin pusher 63 save that the flange 620 is shouldered at 621. This degree of movement of the end 60 of lever 53 occurs when a nickel is passed through the device. The end of pawl 56 will enter the notch 140 in the toothed wheel and arrest the indicator member 81 in a center position intermediate its limits of movement when the first nickel is used. When a second nickel is deposited forthwith without allowing any appreciable time to elapse for operation of the meter, the coin pusher 630 again raises pawl 137 and the element 56 is removed from the notch 140 so that the indicator member 81 is picked up at the half-way mark and carried to the full two hour setting limit. It will be readily appreciated that the counter-actuating rack will have been operated through its cycle to cause the counter to register five units on each of said operations.

Figure 16:
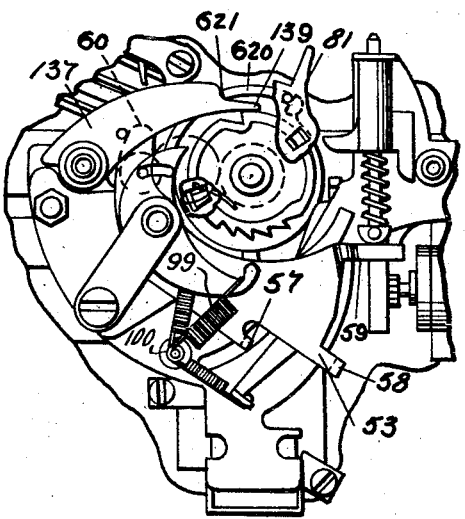
Fig. 16 shows the mechanism of Fig. 13 at approximately the limit of setting operation on an inserted penny.

As shown particularly in Fig. 16, the operation of the meter on an inserted penny will move the end 60 of main lever 53 sufficiently to clear the end 621 of the coin pusher flange but insufficiently to raise the point 139 of pawl 137 above the level of arcuate flange 620 of the coin pusher so that the cut away shoulder 621 abuts the end of pawl 137 and limits the degree of movement of the indicator member 81 to twelve minutes. The modified form of device will therefore afford a motorist an opportunity to set the meter for twelve minutes by the use of one penny or it may be set for one hour by the use of one nickel or for two hours by the use of two nickels in succession. It will be noted that in the modified structure shown in Figs. 13–16 inclusive, the point or fin 139 on member 137 cooperates with the pusher 630 and the plurality of teeth on the toothed hub 73 are not effective. The fin 97 on pawl 56 is thus inoperative to influence the operation of the device under these circumstances and may be removed as specifically shown in Fig. 16.

Regardless of the specific adaptation of the mechanism to a selected series of permissible setting operations, the single lever element 53 unfailingly integrates and synchronizes all phases of the coin control, viz., the release of the pusher, the proper dispatch of a previously deposited coin from the inspection station and the counting of the coin passing through the meter to the inspection station. The same lever element 53 controls the operation of the pawl on the toothed hub and is thus a vital element in apportioning the extent of setting movement of the indicator with relation to the size of the coin deposited.

What is claimed is:

1. In a manually operable parking meter, the combination of means for successively arresting deposited coins of predetermined different diameters at a common position, a manually operated pusher for successively engaging said coins and displacing the coin arresting means different distances determined by the diameter of the coin thus engaged, a lever rockable by the coin arresting means for distances differing with said different predetermined diameters of the coins, an indicator engageable by the pusher for setting the indicator, and means controlled by the movement of the said lever for limiting the extent of indicator movement by the pusher in predetermined relation to the extent of movement of the said lever.

2. In a multi-coin parking meter, the combination of means to direct selectively deposited coins of predetermined different diameters and values through a common path, a manually operable pusher having an end portion movable across said path, a lever pivoted intermediate its ends alongside the path with its top end normally in position to block the pusher, a lateral projection on the lever to arrest a deposited coin in the path of the end portion of the pusher, whereby movement of the pusher against the lowermost arrested coin rocks the lever end out of blocking position, an indicator movable in a setting direction by operation of said pusher, and complementary means comprising a toothed hub on the indicator and a pawl operable by the lever for positively limiting the extent of setting movement of the indicator according to the relative diameter of the coin engaged by the pusher.

3. In a parking meter, the combination of a rockable indicator unit, a manually operable pusher engageable with said indicator unit for moving it in one direction, a timing mechanism connected in driving relation with the indicator for driving it in a reverse direction, a pivoted lever having an end normally in the path of said pusher to preclude movement of the indicator unit by said pusher, a coin guide for moving selectively deposited coins of predetermined different diameters through a common path, a projection on the side of the said lever normally disposed in the path of the deposited coins for arresting a lowermost coin in position for abutment by said pusher, a toothed hub mounted for movement with the indicator, a pawl pivoted alongside the lever normally engaged on the toothed hub, a pin and slot connection between the pawl and lever for releasing the toothed hub on initial movement of said lever, and a fin engageable to ride outside the pusher upon movement of the lever by one of said coins of different diameter whereby the pawl is held inoperative to permit continued movement of the indicator by said pusher.

4. In a multi-coin time meter the combination of an indicator unit, means yieldably urging said unit to a zero position in accordance with the passage of time, a manually movable pusher for engagement with the indicator unit to set said unit at a distance from zero position, a pivoted lever, a coin way member for directing selectively deposited coins of predetermined large and small diameters, a projection on the side of said lever disposed in the path of the deposited coin for arresting a lowermost coin in position for abutment by said pusher, a toothed hub mounted for movement with the indicator, a pawl pivoted along side the lever and normally engaging the toothed hub, a lost motion connection between the pawl and the lever and a fin member on said pawl and movable therewith, the movement of the pusher against a coin of predetermined small diameter serving to rock the lever and disengage the pawl momentarily for subsequent engagement with a tooth on said hub, the movement of said pusher against an arrested coin of predetermined large diameter serving to move said lever and pawl to a greater distance whereby the fin rests on the outside of the pusher and retains the pawl in disengaged relation with said toothed hub during continued manual movement of the pusher.

5. In a parking meter the combination of means providing a way for the movement of selected coins of large and small diameter through a common path, a lever having a lateral projection extending into said path for arresting the lowermost deposited coin, a manually operable pusher movable against the coin for displacing said lever, a rockable indicator, cooperating means on said pusher and indicator for effecting setting movement of the indicator, a toothed hub movable with the indicator, a pawl having a lost motion connection with said lever and adapted to be disengaged from said toothed hub upon movement by operation of the lever on a deposited coin, said lever being moved relatively different distances during operation of the pusher on the coins of predetermined large and small diameter, and a fin on said pawl adapted for movement beyond the pusher during operation of the pusher on a coin of predetermined large diameter whereby the pawl is retained out of engagement with the toothed hub during continued manual movement of said pusher.

FRANK L. MICHAELS.